(12) United States Patent
Shirai et al.

(10) Patent No.: US 7,372,404 B2
(45) Date of Patent: May 13, 2008

(54) APPARATUS FOR ESTIMATING DIRECTION OF ARRIVAL WAVE

(75) Inventors: Hideki Shirai, Tokyo (JP); Kazuma Natsume, Aichi-ken (JP)

(73) Assignees: Denso IT Laboratory, Inc., Tokyo (JP); Denso Corporation, Achi-Ken (JP)

( * ) Notice: Subject to any disclaimer, the term of this patent is extended or adjusted under 35 U.S.C. 154(b) by 30 days.

(21) Appl. No.: 11/390,866

(22) Filed: Mar. 27, 2006

(65) Prior Publication Data

US 2006/0224655 A1    Oct. 5, 2006

(30) Foreign Application Priority Data

Mar. 31, 2005    (JP)    ............................. 2005-100314

(51) Int. Cl.
*G01S 5/02*    (2006.01)
(52) U.S. Cl. ...................................... 342/417; 342/442
(58) Field of Classification Search ................ 342/417, 342/424, 437, 442, 443–445; 708/607
See application file for complete search history.

(56) References Cited

FOREIGN PATENT DOCUMENTS

| JP | 11-344517 | 12/1999 |
|---|---|---|
| JP | 2000-121716 | 4/2000 |

OTHER PUBLICATIONS

"Adaptive Antenna Technique," published by Ohmsha, written by Nobuo Kikuma (ISBN4-274-03611-1); pp. 158-161. (2003).
"Matrix Computation" (3rd Ed.), published by Johns Hopkins University Press, written by Gene H. Golub et al. (ISBN0-8018-5414-8); pp. 248-251 (1996).

*Primary Examiner*—Dao L Phan
(74) *Attorney, Agent, or Firm*—Duane Morris LLP

(57) ABSTRACT

Apparatus and method are disclosed for estimating direction of an arrival wave, such as radio or acoustic waves. A correlation matrix of an arrival wave is computed, and matrices for obtaining eigenvalues and eigenvectors are produced. Column norms of the matrix, which is subject to a Householder transformation, are computed. Whether a maximum value of the column norms is the same as or lower than a predetermined threshold is judged. A Householder transformation of the matrix is performed only if the maximum value of the column norms is determined to be greater than or equal to the threshold, and not when the maximum value of the column norms is less than the threshold. The eigenvectors and the eigenvalues of the correlation matrix are obtained by further implementing the Householder transformation. The number of arrival waves is judged from the number of times the Householder transformation is performed.

8 Claims, 14 Drawing Sheets

| | | |
|---|---|---|
| 0.6417 | −0.9088 | 0.3189 |
| −0.9088 | 1.3842 | −0.4291 |
| 0.3189 | −0.4291 | 0.9741 |

( START )

---

A =

| | | |
|---|---|---|
| 0.6417 | −0.9088 | 0.3189 |
| −0.9088 | 1.3842 | −0.4291 |
| 0.3189 | −0.4291 | 0.9741 |

INITIALIZATION
A=R
QT=eye(K)
Ite=1    ~S1

QT =

(2)

| | | |
|---|---|---|
| 1 | 0 | 0 |
| 0 | 1 | 0 |
| 0 | 0 | 1 |

Ite = 1

---

Nh = 1

Nh=1
Qi=eye(K)    ~S2

Qi =

(3)

| | | |
|---|---|---|
| 1 | 0 | 0 |
| 0 | 1 | 0 |
| 0 | 0 | 1 |

---

CC =

| | | |
|---|---|---|
| 1.3395 | 2.9260 | 1.2347 |

COLUMN NORM
CC COMPUTING    ~S3
PORTION (4)

ind_k = 2

FIG. 6

(1) 
S4: MAXIMUM VALUE OF COLUMN NORM >Th and Nh < K — YES → indx_k (2) 
A =

| 1.7106 | -0.7610 | -1.1564 |
| -0.0000 | 0.1416 | 0.0414 |
| 0.0000 | 0.7972 | 0.0243 |

S5: PIVOT SELECTION (REPLACEMENT OF COLUMNS)

Nh = 3 — S6

(3) 
H =

| 1.0000 | 0 | 0 |
| 0 | 0.1748 | 0.9846 |
| 0 | 0.9846 | -0.1748 |

S7: COMPUTE HOUSEHOLDER MATRIX H

A =

| 1.7106 | -0.7610 | -1.1564 |
| -0.0000 | 0.8096 | 0.0312 |
| 0.0000 | -0.0000 | 0.0365 |

S8: MATRIX OPERATION A=H*A, Qi=H*Qi (4) Qi =

| -0.5313 | 0.8092 | -0.2509 |
| -0.1055 | 0.2306 | 0.9673 |
| 0.8406 | 0.5404 | -0.0371 |

S4: MAXIMUM VALUE OF COLUMN NORM >Th and Nh < K → NO (5) piv =

| 2 | 3 | 1 |

S9: RETURN COLUMN ORDER WHICH HAS BEEN REPLACED BY PIVOT SELECTION (Ai)

(1) Ai =

|   |   |   |
|---|---|---|
| −1.1564 | 1.7106 | −0.7610 |
| 0.0312 | −0.0000 | 0.8096 |
| 0.0365 | −0.0000 | −0.0000 |

CHANGE ORDER OF COLUMNS FROM SECOND, THIRD, FIRST INTO ORIGINAL ORDER, FIRST, SECOND, THIRD AND SUBSTITUTE THE CHANGED FOR Ai (2) A =

|   |   |   |
|---|---|---|
| 2.1894 | −0.2197 | −0.0194 |
| −0.2197 | 0.7799 | −0.0038 |
| −0.0194 | −0.0038 | 0.0307 |

$A = A_i * Q_i^H$
$QT = Q_i * QT$  ～S10

$A^H$ MEANS CONJUGATE TRANSPOSE MATRIX OF A

QT =

|   |   |   |
|---|---|---|
| −0.5313 | 0.8092 | −0.2509 |
| −0.1055 | 0.2306 | 0.9673 |
| 0.8406 | 0.5404 | 0.0371 |

(3)  S11

Ite ≧ NQR  NO →

(4) Ite = 2

Ite = Ite+1  ～S12

(5) Qi =

|   |   |   |
|---|---|---|
| 1 | 0 | 0 |
| 0 | 1 | 0 |
| 0 | 0 | 1 |

Nh = 1
Qi = eye(K)  ～S2

REPEAT THEREAFTER

CC =

| 4.8423 | 0.6565 | 0.0013 | -------- S3 |

FIG. 8 ind_k =

1

(1)

A =

|   |   |   |
|---|---|---|
| 2.1894 | −0.2197 | −0.0194 |
| −0.2197 | 0.7799 | −0.0038 |
| −0.0194 | −0.0038 | 0.0307 |

------------------ S5

Nh = 2        ------------------ S6

H =           COMPUTE HOUSEHOLDER MATRIX H — S7

(2)

|   |   |   |
|---|---|---|
| 0.9950 | −0.0998 | −0.0088 |
| −0.0998 | −0.9796 | −0.1747 |
| −0.0088 | −0.1747 | 0.9846 |

A =

|   |   |   |
|---|---|---|
| 2.2005 | −0.2964 | −0.0192 |
| −0.0000 | −0.7413 | 0.0003 |
| −0.0000 | −0.1381 | 0.0310 |

A=H*A  Qi=H*Qi — S8

(3) Qi =

|   |   |   |
|---|---|---|
| 0.9950 | −0.0998 | −0.0088 |
| −0.0998 | −0.9796 | −0.1747 |
| −0.0088 | −0.1747 | 0.9846 |

CC =

4.8423    0.5686    0.0010        RENEW COLUMN NORMS — S9

(4) ind_k =

|  |  |  |
|---|---|---|
| 2.2005 | −0.2964 | −0.0192 |
| −0.0000 | −0.7413 | 0.0003 |
| −0.0000 | −0.1381 | 0.0310 |

⎫ ──────── S5

Nh = 3  ──────── S6

H =     [COMPUTE HOUSEHOLDER MATRIX] ～S7

(2)

| 1.0000 | 0 | 0 |
|---|---|---|
| 0 | −0.9831 | −0.1831 |
| 0 | −0.1831 | 0.9831 |

A =     [A=H*A, Qi=H*Qi] ～S8

| 2.2005 | −0.2964 | −0.0192 |
|---|---|---|
| 0.0000 | −0.7541 | −0.0060 |
| 0.0000 | 0 | 0.0305 |

(3) Qi =

| 0.9950 | −0.0998 | −0.0088 |
|---|---|---|
| 0.0998 | 0.9950 | −0.0086 |
| 0.0096 | 0.0076 | 0.9999 | piv =    [RETURN COLUMN ORDER WHICH HAS BEEN REPLACED BY PIVOT SELECTION] ～S9

| 1 | 2 | 3 |

(4) Ai =

| 2.2005 | −0.2964 | −0.0192 |
|---|---|---|
| 0.0000 | 0.7541 | −0.0060 |
| 0.0000 | 0 | 0.0305 |

S10: $A = A_i * Q_i^H$, $QT = Q_i * QT$ (2) S11: Ite ≥ NQR ? YES (3)
```
lambda =
    2.2192
    0.7504
    0.0304
```

S14: $\lambda = \mathrm{diag}(A)$, $Q = (QT)^H$ $A^H$ MEANS CONJUGATE TRANSPOSE MATRIX OF A

```
Q =
   -0.5255   -0.1652    0.8346
    0.7773    0.3055    0.5499
   -0.3458    0.9377   -0.0322
```

END

METHOD OF COMPUTING COLUMN NORMS

FOLLOWING MATRIX A1 IS SUPPOSED $$A_1 = \begin{bmatrix} a_{11} & a_{12} & a_{13} \\ a_{21} & a_{22} & a_{23} \\ a_{31} & a_{32} & a_{33} \end{bmatrix}$$

THE FOLLOWING CALUCULATION IS IMPLEMENTED WHEN FIRSTLY COMPUTING COLUMN NORM CC (SQUARE OF COLUMN NORM)

$$CC = \begin{bmatrix} a_{11}^2 + a_{21}^2 + a_{31}^2 & a_{12}^2 + a_{22}^2 + a_{32}^2 & a_{13}^2 + a_{23}^2 + a_{33}^2 \end{bmatrix}$$

$$= \begin{bmatrix} C_1 & C_2 & C_3 \end{bmatrix}$$

(2)

NEXT, SUPPOSE MATRIX A2 ON WHICH HOUSEHOLDER TRANSFORMATION HAS BEEN IMPLEMENTED ONCE $$A_2 = \begin{bmatrix} a'_{11} & a'_{12} & a'_{13} \\ 0 & a'_{22} & a'_{23} \\ 0 & a'_{32} & a'_{33} \end{bmatrix}$$

← THE NECESSARY ARE COLUMN NORMS IN FRAME

THERE ARE TWO METHODS OF COMPUTING COLUMN NORM

FIRST METHOD: COMPUTE IN SIMILAR WAY TO FIRST TIME $$CC = \begin{bmatrix} - & a'^2_{22} + a'^2_{32} & a'^2_{23} + a'^2_{33} \end{bmatrix} \quad \cdots (A)$$

SECOND METHOD: UTILIZE THE LAST COMPUTED RESULT $$CC = \begin{bmatrix} - & C_2 - a'^2_{12} & C_3 - a'^2_{13} \end{bmatrix} \quad \cdots (B)$$

SECOND METHOD EMPLOYS THAT HOUSEHOLDER TRANSFORMATION LEADS TO NO CHANGE OF (SQUARE OF) NORM OF EACH COLUMN

FIG. 13

(a)
$$X = \begin{bmatrix} x_1 \\ x_2 \\ x_3 \end{bmatrix}$$

(b)
$$R = \overline{X \cdot X^H}$$

$X^H$ MEANS CONJUGATE TRANSPOSE MATRIX OF X $\overline{\phantom{XXX}}$ MEANS EQUALIZATION

APPARATUS FOR ESTIMATING DIRECTION OF ARRIVAL WAVE

BACKGROUND OF THE INVENTION

This invention relates to an apparatus for estimating direction of arrival wave, such as radio wave and acoustic wave, which arrives at a plurality of antenna elements.

A technique of estimating arrival directions of one or more arrival waves, such as radio waves and acoustic waves, of the same frequency which are caught by two or more antenna elements is well known. As one of such methods, MUSIC (Multiple Signal Classification) method is well known (see Japanese patent application the publication number of which is 2000-121716.

In MUSIC method, on the basis of a signal data vector of arrival waves, a correlation matrix thereof is obtained, and an eigenvalue decomposition operation for decomposing the obtained correlation matrix into eigenvectors and eigenvalues is implemented, and azimuths of the arrival waves are estimated from the thus obtained eigenvectors. In order to obtain the arrival azimuth, it is necessary to estimate the number of arrival waves in advance. Generally, eigenvalues are used in the estimation of the number of arrival waves. Such methods are AIC, MDL and threshold methods, for instance.

[Patent-related document 1] Japanese patent application the publication number of which is 2000-121716

In such an eigenvalue decomposition operation, methods with Householder's method or Jacobi method are known. If a Signal to Noise ratio of an arrival wave is high, that is, the arrival wave is very big in comparison with the noise, or a difference of arrival azimuths of two or more arrival waves is small, the ratio of a maximum value and a minimum value of the eigenvalues is high, so that underflow may occur in the operation of the smaller eigenvalue, and the computed eigenvalue may be a negative value or a value credibility on which is low. If a fixed decimal mode is used for a word size which is insufficient for an operation, the above-mentioned inconvenience is especially ready to appear.

If the credibility on the eigenvalues is low, the number of arrival waves which is estimated from the eigenvalues is likely to be incorrect. In addition, the vain operation is repeated in the eigenvalue decomposition operation in order to finally obtain the eigenvalue having low credibility, so that unnecessary operation is loaded on a processing unit.

The object of the invention is to provide an apparatus for estimating direction of arrival wave, for reliably estimating the number of arrival waves, extremely avoiding vain eigenvalue decomposition operations in order to overcome the above-mentioned inconvenience.

BRIEF DESCRIPTION OF THE DRAWINGS

FIG. 4 is a view showing an instance of concrete operation in the flowchart of FIG. 3;

FIG. 6 is a view showing an instance of concrete operation in the flowchart of FIG. 3;

FIG. 8 is a view showing an instance of concrete operation in the flowchart of FIG. 3;

FIG. 9 is a view showing an instance of concrete operation in the flowchart of FIG. 3;

FIG. 10 is a view showing an instance of concrete operation in the flowchart of FIG. 3;

FIG. 11 is a view showing one of methods of operating column norm;

FIG. 13 is a view showing an instance of operation expressions; and

SUMMARY OF THE INVENTION

Figure 1:
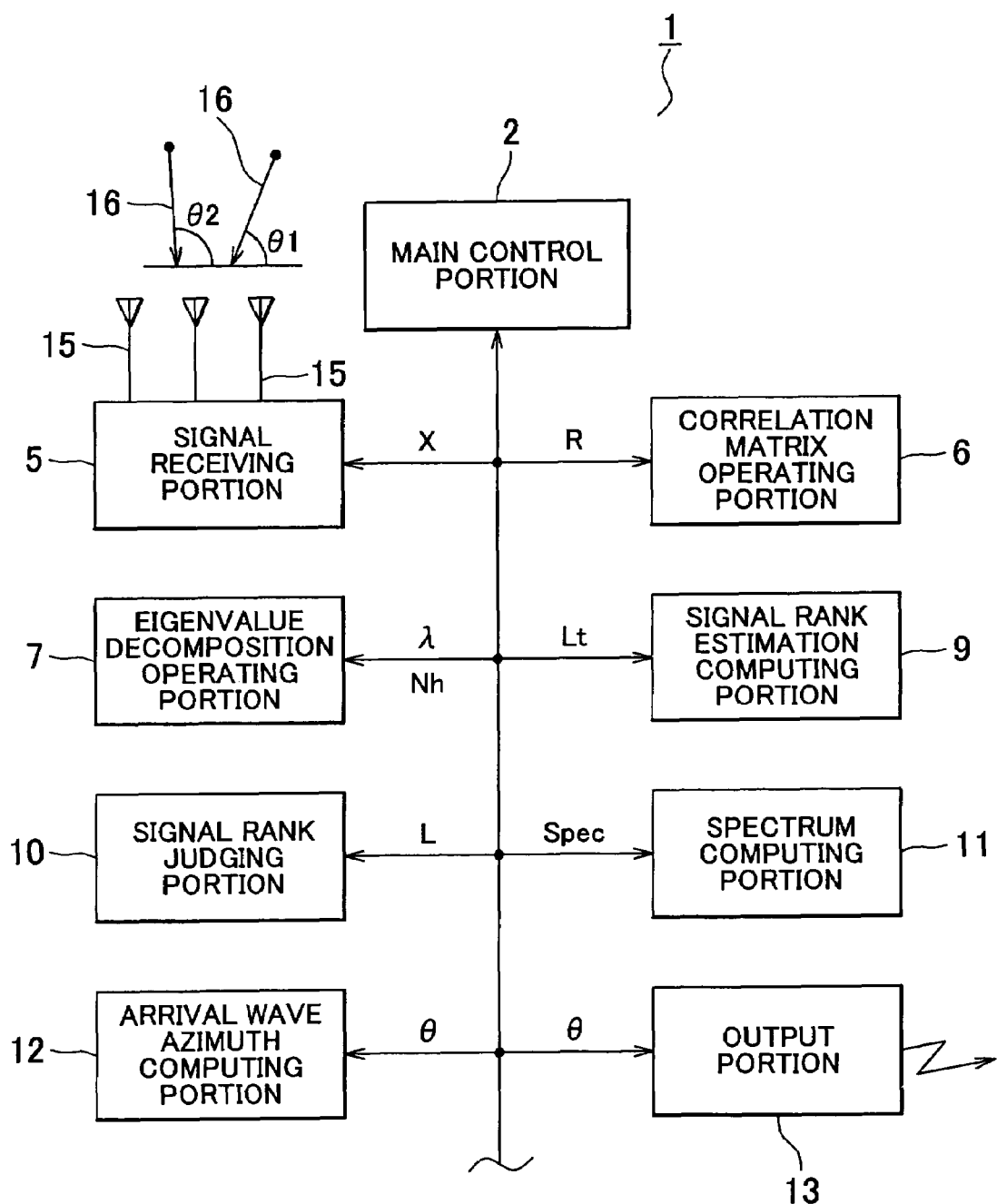
FIG. 1 is a block diagram showing an instance of an apparatus for measuring azimuth of arrival radio wave.

One aspect of the invention is apparatus for estimating direction of arrival wave, for estimating arrival directions of arrival waves from received data of two or more said arrival waves which are received by two or more antennas, comprising:

means for computing correlation matrix, for computing a correlation matrix from said received data of two or more said arrival waves which are received by two or more said antennas;

eigenvalue decomposition operating means, for implementing Householder transformation operations on said correlation matrix which has been computed by said means for computing correlation matrix, and for decomposing said correlation matrix into eigenvectors and eigenvalues;

matrix producing means provided at said eigenvalue decomposition operating means, for producing a matrix for obtaining said eigenvalues for said correlation matrix and a matrix for obtaining said eigenvectors therefor;

column norm operating means provided at said eigenvalue decomposition operating means, for respectively computing column norms from elements of respective columns of said matrix which is a subject for a Householder transformation operation every implementation of said Householder transformation operation in said matrix for obtaining said eigenvalues;

means for judging maximum value of column norm provided at said eigenvalue decomposition operating means, for judging whether or not a maximum value of said column norms of said matrix which is said subject for said Householder transformation operation, which has been computed by said column norm operating means is the same as or lower than a predetermined threshold value every implementation of said Householder transformation operation;

means for implementing Householder transformation operation provided at said eigenvalue decomposition operating means, for repeating said Householder transformation operation on said matrix for obtaining said eigenvalues only if said means for judging maximum value of column norm judges said maximum value of said column norms of said matrix which is said subject for said Householder transformation operation, which has been computed by said column norm operating means not to be the same or not to be lower than said predetermined threshold value;

means for controlling implementation of transformation operation provided at said eigenvalue decomposition operating means, for breaking implementation of said Householder transformation operation by said means for implementing Householder transformation operation, if said means for judging maximum value of column norm judges said maximum value of said column norms of said matrix which is said subject for said Householder transformation operation, which has been computed by said column norm operating means to be the same as or lower than said predetermined threshold value;

means for implementing convergence operation provided at said eigenvalue decomposition operating means, for further implementing said Householder transformation operations by said means for implementing Householder transformation operation and said means for controlling implementation of transformation operation on said matrix for obtaining said eigenvalue on which implementation of said Householder transformation operation has been broken by said means for controlling implementation of transformation operation up to a predetermined time, and for obtaining said eigenvectors and said eigenvalues of said correlation matrix on the basis of a result of said Householder transformation operations; and means for judging signal rank, for judging a number of said arrival waves on the basis of said obtained eigenvalue and said implementation time of said Householder transformation operations by said means for implementing Householder transformation operation.

According to this aspect of the invention, the implementation of the Householder transformation operation on the column, which does not correspond to a signal, credibility of which is low in computed result, can be saved by properly setting the threshold value since in the Householder transformation operation, further Householder transformation operation is not implemented if the maximum value of the column norms to be computed from the matrix for obtaining the eigenvalue is the same as or lower than a predetermined threshold value, thereby extremely preventing the implementation of the vain eigenvalue decomposition operation.

In addition, if the maximum value of the column norms to be computed from the matrix for obtaining the eigenvalue is the same as or lower than the predetermined threshold value, subsequent Householder transformation operation is not implemented, so that the implementation time of the Householder transformation operations up to this point of time corresponds to the number of signals (rank), thereby judging highly credible rank of the arrival waves. Then, the number of the arrival waves which is obtained from the eigenvalue is judged, being amended on the basis of the implementation time of the Householder transformation operations even if more arrival waves are computed in error. That is, more correct judgment is possible.

Another aspect of the invention is the apparatus for estimating direction of arrival wave, wherein memory means for storing zero or a value approximating to zero as said threshold value is provided, and said means for controlling implementation of transformation operation breaks further implementation of said Householder transformation operation if said maximum value of said column norms is negative.

According to this aspect of the invention, it is possible to eliminate the implementation of the vain Householder transformation operation on the column the eigenvalue of which is negative since the threshold value is zero or a value approximating to zero.

Another aspect of the invention is apparatus for estimating direction of arrival wave, for estimating an arrival direction of an arrival wave from received data of two or more said arrival waves which are received by two or more antennas, comprising:

means for computing correlation matrix, for computing a correlation matrix from said received data of two or more said arrival waves which are received by two or more said antennas;

eigenvalue decomposition operating means, for implementing a Householder transformation operation on said correlation matrix which has been computed by said means for computing correlation matrix, and for decomposing said correlation matrix into an eigenvector and an eigenvalue;

matrix producing means provided at said eigenvalue decomposition operating means, for producing a matrix for obtaining said eigenvalue for said correlation matrix and a matrix for obtaining said eigenvector therefor;

column norm operating means provided at said eigenvalue decomposition operating means, for respectively computing column norms of elements of respective columns of said matrix which is a subject for a Householder transformation operation every implementation of said Householder transformation operation in said matrix for obtaining said eigenvalue;

means for judging maximum value of column norm provided at said eigenvalue decomposition operating means, for judging whether or not a maximum value of said column norms of said matrix which is said subject for said Householder transformation operation, which has been computed by said column norm operating means is the same as or lower than a predetermined threshold value every implementation of said Householder transformation operation;

means for implementing Householder transformation operation provided at said eigenvalue decomposition operating means, for repeating said Householder transformation operation on said matrix for obtaining said eigenvalue only if said means for judging maximum value of column norm judges said maximum value of said column norms of said matrix which is said subject for said Householder transformation operation, which has been computed by said column norm operating means not to be the same as or not to be lower than said predetermined threshold value;

means for controlling implementation of transformation operation provided at said eigenvalue decomposition operating means, for breaking implementation of said Householder transformation operation by said means for implementing Householder transformation operation, if said means for judging maximum value of column norm judges said maximum value of said column norms of said matrix which is said subject for said Householder transformation operation, which has been computed by said column norm operating means to be the same as or lower than said predetermined threshold value;

means for implementing convergence operation provided at said eigenvalue decomposition operating means, for further implementing said Householder transformation operations by said means for implementing Householder transformation operation and said means for controlling implementation of transformation operation on said matrix for obtaining said eigenvalue on which implementation of said Householder transformation operation has been broken by said means for controlling implementation of transformation operation up to a predetermined time, and for obtaining said eigenvector and said eigenvalue of said correlation matrix on the basis of a result of said Householder transformation operations;

means for judging signal rank, for judging a number of said arrival waves on the basis of said implementation time of said Householder transformation operations by said means for implementing Householder transformation operation; and means for setting threshold value, for setting said predetermined threshold value so as to be higher than said column norm of said matrix for obtaining said eigenvalue when only noises are caught in said received data.

According to this aspect of the invention, the threshold value is set in advance so as to be higher than the column norm of the matrix for obtaining the eigenvalue when only noises are caught in received data, so that it is possible to eliminate the implementation of the Householder transformation operation on noises and to decrease the operation volume.

Another aspect of the invention is the apparatus for estimating direction of arrival wave, wherein said means for setting threshold value sets said predetermined threshold value so as to be higher than said column norm of said matrix for obtaining said eigenvalue when only noises are caught in said received data and so as to be lower than said column norm of said matrix for obtaining said eigenvalue for said signal of said arrival wave of said received data.

According to this aspect of the invention, the threshold value is set in advance so as to be higher than the column norm of the matrix for obtaining the eigenvalue when only noises are caught in received data and so as to be lower than the column norm of the matrix for obtaining the eigenvalue for the signal of the arrival wave of the received data, so that it is possible to eliminate the implementation of the Householder transformation operation on noises and to decrease the operation volume. In addition, the Householder transformation operation implementation time can be immediately determined as the number of signals of arrival waves without the judgment processing on the number of the arrival waves on the basis of the eigenvalue.

Another aspect of the invention is the apparatus for estimating direction of arrival wave, wherein said means for setting threshold value changeably sets said predetermined threshold value, corresponding to surroundings or an observation distance.

According to this aspect of the invention, for instance, the surroundings is detected with a car navigation system. Then, radio waves radiated from a radar are expected to be reflected by many places (vehicles and walls) and to return in the detected tunnel. An effective operation is possible in such a way that more arrival waves are correctly caught by setting the threshold value (Th) as a low value when many numbers of arrival waves are expected, and the operation on the signal relating to the vain noise column norm is saved by setting the threshold value (Th) as a relatively higher value on an open road where small numbers of arrival waves are expected. Besides, even if the observation distance is distant, the similar effects are exercised since the arrival waves are expected to be reflected from many places.

Another aspect of the invention is the apparatus for estimating direction of arrival wave, wherein means for setting operation implementation time, for setting a maximum implementation time of said Householder transformation operations by said means for implementing Householder transformation operation is provided, and said means for implementing Householder transformation operation implements said Householder transformation operations within said maximum implementation times of said Householder transformation operations which is set by said means for setting operation implementation time.

According to this aspect of the invention, if the maximum number of arrival waves is known in advance, vain operation can be saved by setting the implementation time of the Householder transformation operations by means for implementing Householder transformation operation as the maximum number of the arrival waves.

Another aspect of the invention is the apparatus for estimating direction of arrival wave, wherein said means for setting operation implementation time changeably sets said maximum implementation time of said Householder transformation operations, corresponding to surroundings or an observation distance.

According to this aspect of the invention, for instance, the surroundings is detected with a car navigation system. Then, radio waves radiated from a radar are expected to be reflected by many places (vehicles and walls) and to return in the detected tunnel. An effective operation is possible in such a way that the eigenvalues of more arrival waves are correctly computed by setting the implementation time of the Householder transformation operations as a high value when many numbers of arrival waves are expected, and the eigenvalue computing operation on the signal relating to the vain noise column norm is saved by setting the implementation time of the Householder transformation operations as a low value on an open road where small numbers of arrival waves are expected. In addition, even if the observation distance is distant, the similar effects are exercised since the arrival waves are expected to be reflected from many places.

Another aspect of the invention is the apparatus for estimating direction of arrival wave, wherein means for controlling implementation time of transformation operations, for controlling said implementation time of said Householder transformation operations in each implementation time with said means for implementing Householder transformation operation and said means for controlling implementation of transformation operation by said means for implementing convergence operation is provided, and said means for controlling implementation time of transformation operation controls said implementation time of said Householder transformation operations in a Nth time with said means for implementing Householder transformation operation and said means for controlling implementation of transformation operation so as to be the same as or lower than said implementation time of said Householder transformation operations in the last implementation time or before.

According to this aspect of the invention, it is possible to prevent implementation of the Householder transformation operation on the matrix portion, on which no Householder transformation operation has been implemented in the last operation cycle due to the underflow, in order to improve the operation efficiency.

DESCRIPTION OF THE PREFERRED EMBODIMENTS

An embodiment of the invention will now be explained, referring to appended drawings.

An apparatus for measuring azimuth of arrival wave 1 has a main control portion 2, as shown in FIG. 1. A signal receiving portion 5, a correlation matrix operating portion 6, an eigenvalue decomposition operating portion 7, a signal rank estimation computing portion 9, a signal rank judging portion 10, a spectrum computing portion 11, an arrival wave azimuth computing portion 12, and an output portion 13 are connected with the main control portion 2 via a bus line 3. The signal receiving portion 5 is provided with K numbers (two or more) of antennas 15.

The apparatus for measuring azimuth of arrival wave 1 of FIG. 1 is merely illustrative. The respective elements within enclosures in FIG. 1 may be replaced by a CPU (central processing unit) comprising a computer and proper memories, and program for activating a computer. In such a case, a computer functions as the elements comprising the apparatus for measuring azimuth of arrival wave 1 of FIG. 1 by executing respective steps of the program.

Figure 14:
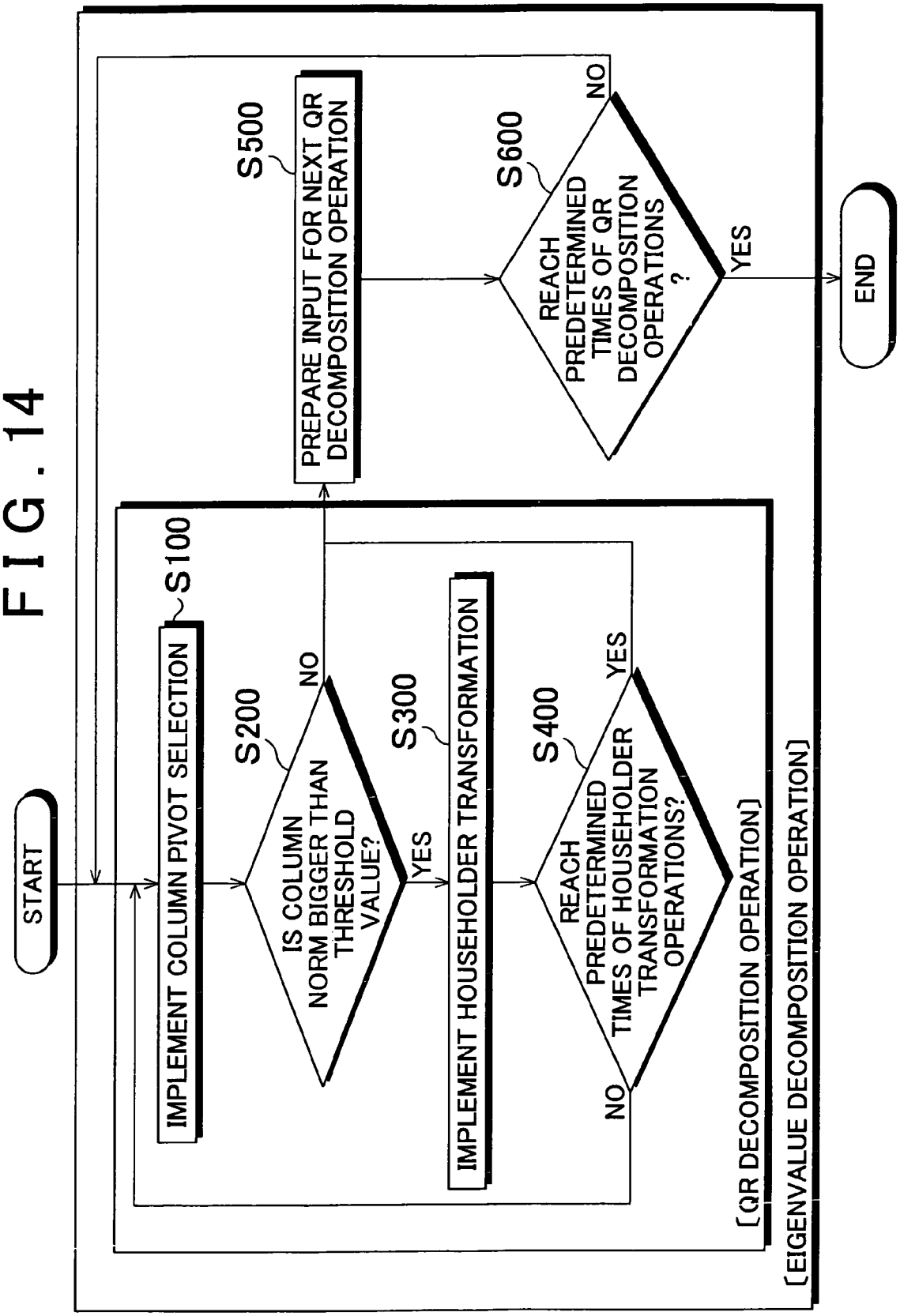
FIG. 14 is a flowchart exemplarily showing a basic concept of the eigenvalue decomposition operation.

Functions of the signal receiving portion 5, the correlation matrix operating portion 6, the eigenvalue decomposition operating portion 7, the signal rank estimation computing portion 9 and the signal rank judging portion 10 of the apparatus for measuring azimuth of arrival wave 1 of FIG. 1 are now explained, referring to FIG. 14.

[Signal Receiving Portion 5]

If complex data which are obtained from the respective antenna elements 15-1 through 15-K (K is the number of the antenna elements) at a sampling time $m\Delta T1$ ($\Delta T1$ is a sampling interval and m is a natural number) are $x1(m)$, $x2(m)$, ... $xK(m)$, the signal receiving portion obtains data vector $x(m)$ having a size K which is represented with Expression (1). An upper suffix T denotes a transpose.

$$x(m)=[x^1(m)x^2(m) \ldots xK(m)]^T \quad \text{[Expression 1]}$$

[Correlation Matrix Operating Portion 6]

The correlation matrix operating portion obtains a correlation matrix $Rxx(n)$ at a time $n\Delta T2$ ($\Delta T2$ is a time interval for computing a correlation matrix) with Expression (2). Rxx is K×K positive semidefinite hermitian matrix or positive definite hermitian matrix. In case of a positive semidefinite hermitian matrix, eigenvalues are all real numbers which are zero or more (In case of a positive definite, the eigenvalues are real numbers which are bigger than zero), which is explained hereinafter. An upper suffix H denotes a complex conjugate transpose. SSN is the number of snapshots, and denotes the number of data vectors which is used for an operation of the correlation matrix. β is a forgetting factor which bounds is zero (0) through one (1). $Rxx(n-1)$ is the correlation matrix at the time $(n-1)\Delta T2$.

[Expression 2]

$$R_{xx}(n) = \beta\left(\sum_{m=1}^{SSN} x(m)x(m)^H / SSN\right) + (1-\beta)R_{xx}(n-1) \quad (2)$$

If the antenna elements are arranged with a centro-symmetry, a symmetric correlation matrix Ryy having real numbers is obtained by a transformation as shown in Expression (3). QK is a K×K unitary matrix. See documens [2] and [4] for the details. Real represents an operation for taking out only the real number portions.

$$R_{yy}(n)=\text{real}(Q_K^H R_{xx}(n) Q_K) \quad \text{[Expression 3]}$$

When using a real number correlation matrix Ryy, volume of subsequent operation of decomposing the eigenvalue can be widely saved.

The thus obtained correlation matrix Ryy (or Rxx) is outputted to the eigenvalue decomposition operating portion, and is decomposed into eigenvectors Q and eigenvalues λ.

[Eigenvalue Decomposition Operating Portion 7]

The operation of decomposing the eigenvalue is executed by repeating a QR decomposition with a Householder transformation operation. One operation of decomposing eigenvalue includes two or more QR decomposition operations, and one QR decomposition operation includes two or more Householder transformation operations. In this case, an implementation number of the QR decomposition operations in one operation of decomposing the eigenvalue is NQR [times]. In one QR decomposition operation, (K−1) times (K is the number of the antenna elements) of Householder transformation operations are executed at the maximum. The implementation times which the Householder transformation operations are executed is stored in proper memory means.

Referring to an instance of a flowchart (FIG. 14) processes are now mentioned. At first, a column pivot selection is executed (S100 of FIG. 14). An advantageous point of the column pivot selection is that obtained eigenvectors are orthogonal and the operation accuracy is improved even if a rank of the matrix to be operated (Rxx or Ryy in the above-mentioned case) is short (This is called "rank deficient"). Concretely speaking, "a column having the maximum norm" is moved to (exchanged for) the leftest column in the matrix to be operated. A ducument [3] (pages 248-250) refers to the Householder transformation operation with the column pivot selection.

After selecting the column pivot, whether or not the Householder transformation process is executed is judged (S200 of FIG. 14). Such judgment is whether or not the maximum value of the column norm is bigger than a predetermined threshold value (Th).

That is, the Householder transformation is executed if the maximum value of the column norm>=threshold value. On the contrary, the Householder transformation is stopped if the maximum value of the column norm<threshold value.

Generally, the threshold value Th is set as zero (0) or a value approximating to zero in advance so as to check whether or not the maximum value of the column norm is negative. As already mentioned, Ryy (or Rxx) is a positive semidefinite hermitian matrix, so that the obtained eigenvalues are always real numbers which are zero or more (real numbers which are bigger than zero in case where Ryy is a positive definite). The eigenvalues and the column norms mutually strongly related with each other. In case where the column norm is negative or a value approximating to zero, operation error, such as underflow, may occur. Then, in the subsequent Householder transformation operation, the credibility on the obtained eigenvalues is lowered, and the computing volume wastefully increases. For this reason, the Householder transformation is stopped and the process enters Step S500 of FIG. 14.

On the other hand, when execution of the Householder transformation is judged, the Householder transformation is executed (S300 of FIG. 14). For instance, the matrix A(j) which is obtained after the j-th (j=1, 2, 3) Householder transformation in case where K=4, is shown in Expressions (4), (5), (6). In this case, an unspecific value is inserted into X mark. H is a K×K Householder matrix. A(0) is an initial matrix, and at first, the correlation matrix Ryy is inserted therein.

$$A(0) = R_{yy} = \begin{bmatrix} x & x & x & x \\ x & x & x & x \\ x & x & x & x \\ x & x & x & x \end{bmatrix}$$ [Expression 4]

$$A(1) = H_1 A(0) = \begin{bmatrix} x & x & x & x \\ 0 & x & x & x \\ 0 & x & x & x \\ 0 & x & x & x \end{bmatrix}$$ [Expression 5]

$$A(2) = H_2 A(1) = \begin{bmatrix} x & x & x & x \\ 0 & x & x & x \\ 0 & 0 & x & x \\ 0 & 0 & x & x \end{bmatrix}$$ [Expression 6]

$$A(3) = H_3 A(2) = \begin{bmatrix} x & x & x & x \\ 0 & x & x & x \\ 0 & 0 & x & x \\ 0 & 0 & 0 & x \end{bmatrix}$$ [Expression 7]

By the j-th Householder transformation, the elements subsequent to the j-th column and the j+1 row of the matrix A(j−1) thus become zero. See the document [2] (pages 209-210) for the method of computing the Householder matrix H with such a transformation. If (K−1) times of the Householder transformation operations are executed at the maximum, the matrix A(K−1) becomes a right upper triangular matrix (the matrix wherein the elements lower than diagonal elements are all zero). In an actual processing, the matrix may not become the perfect upper triangular matrix since the second Householder transformation or the subsequent Householder transformations may be broken due to a threshold value judgment. In this case, the eigenvalue in the portion on which the Householder transformation operation has not been executed is not converged on a correct value. But, a finally obtained eigenvector matrix Q is a unitary matrix wherein the respective column vectors are normally orthogonal. For this reason, if the Householder transformation is repeated the times the same as the number of the signal rank (the number of arrival waves) in minimum (that is, if the eigenvalues and the eigenvectors of signals are correctly obtained), a noise eigenvector space (noise subspace) can be correctly obtained. This is evolved from Expression (8) where EsEsH is a K×K matrix showing the signal subspace, and EnEnH is a K×K matrix showing the noise subspace. Es=[e(1) e(2) . . . e(L)] is a K×L matrix wherein the L numbers of signal eigenvectors are laterally arranged, and En=[e(K−L) . . . e(K)] is a K×(K−L) matrix wherein (K−L) numbers of the noise eigenvectors are laterally arranged, and Ik is a K×K unit matrix. If the signal eigenvectors Es is correctly obtained, the correct noise subspace can be thus uniformized.

$$E_S E_S^H + E_N E_N^H = I_K$$

$$\text{if } [E_S \ E_N][E_S \ E_N]^H = I_K$$ [Expression 8]

Since the noise subspace is necessary in order to compute a MUSIC spectrum, the correct spectrum can be obtained.

If the Householder transformation is broken in S200 of FIG. 14 or the Householder transformation is judged to reach a predetermined times (k−1) in S400 of FIG. 14, the process enters S500 of FIG. 14 and calculation is executed with Expressions (9) and (10).

$$A(0) = A(Nh(ite))Q_{ite}^H$$ [Expression 9]

$$Q = Q_{ite} Q$$ (10)

where $Q_{ite} = H_{Nh(ite)} \ldots H_2 H_1 A(Nh(ite)) = H_{Nh(ite)} \ldots H_2 H_1 A(0)$ [Expresssion 10]

In Expression (10), a K×K unit matrix is inserted as an initial value for Q in advance. In the expression, Nh(ite) (=<K−1) is the implementation times of the Householder transformations to be executed in the ite-th QR decomposition operation, and is stored in proper memory means in order to utilize it for a subsequent estimation of the signal rank. Subsequently, whether or not the QR decomposition operation reaches the predetermined times (NQR times) is judged in S600 of FIG. 14. If the QR decomposition operation does not reach the predetermined times, A(0) is used as an input in the next QR decomposition operation. If the QR decomposition operation reaches the predetermined times, the eigenvalue decomposition operation is finished. At this time, the diagonal elements of A(0) are the eigenvalues $\lambda=[\lambda1 \ \lambda2 \ldots \lambda K]T$, and the respective columns of the matrix QH=[e(1) e(2) . . . e(K)]H are the eigenvectors corresponding to the respective eigenvalues $\lambda1$ through $\lambda K$.

[Signal Rank Estimation Computing Portion 9]

After thus obtaining the eigenvalue $\lambda$ of the correlation matrix Ryy (or Rxx) in the eigenvalue decomposition operating portion 7, the obtained eigenvalues $\lambda$ are outputted to the signal rank estimation operating portion 9 of FIG. 1, and the signal rank estimation operating portion 9 estimates the number of arrival waves (signal rank) from the eigenvalues $\lambda$. The estimation methods are AIC, MDL, threshold method, and the like. In the threshold method, a signal rank Lt, that is, the number of arrival waves Lt is estimated in such a way that an eigenvalue which is bigger than a predetermined threshold value is judged to be an eigenvalue of a signal, and an egigenvalue which is smaller than the predetermined threshold value is judged to be an eigenvalue of noise.

[Signal Rank Judging Portion 10]

The signal rank judging portion 10 sets the smallest value among the signal rank which has been estimated by the signal rank estimation computing portion 9, that is, the number of arrival waves Lt, and the implementation times Nh(i)(i=1, 2, . . . NQR) of the Householder transformations which has been executed by the eigenvalue decomposition operating portion 7 as the signal rank, that is, the number of arrival waves L, and the obtained number of the arrival waves (signals) L is outputted to the spectrum computing portion 11.

[Spectrum Computing Portion 11]

Figure 2:
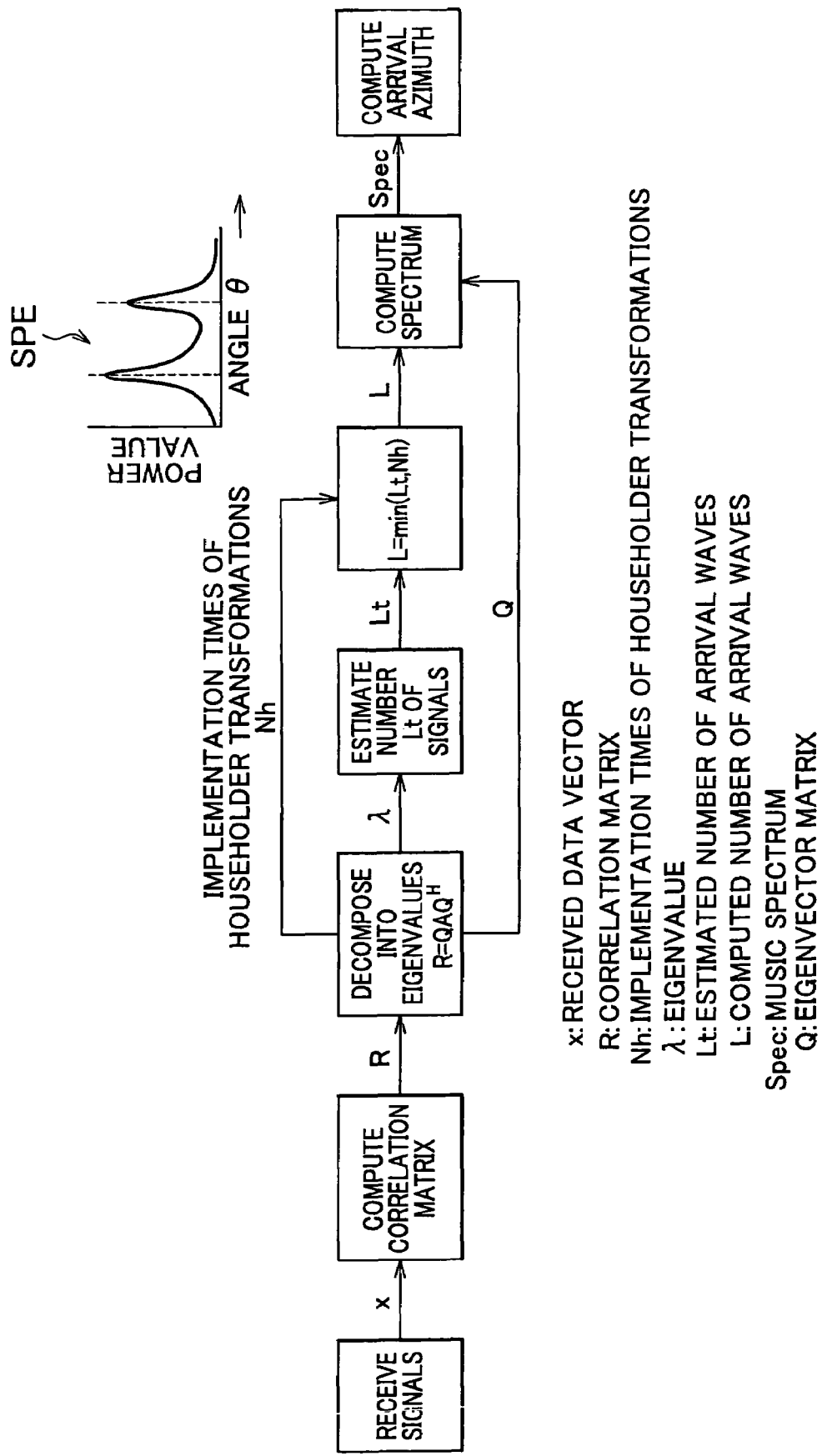
FIG. 2 is a chart showing signal processing.

After thus judging the signal rank L, taking the implementation times Nh of the Householder transformation operations into consideration by the signal rank judging portion 10, and outputting the obtained number L to the spectrum computing portion 11, the spectrum computing portion 11 calculates a MUSIC spectrum SPE as shown in FIG. 2 with a known method, and the obtained MUSIC spectrum SPE is outputted to the arrival wave azimuth computing portion 12.

[Arrival Wave Azimuth Computing Portion 12]

The arrival wave azimuth computing portion 12 can compute azimuths $\theta1$ and $\theta2$ of the arrival waves with a known method from the MUSIC spectrum SPE. As already mentioned, in advance of calculating the MUSIC spectrum SPE, the number of the signals L has been corrected on the basis of the time Nh of the Householder transformation operations in the eigenvalue decomposition operation on the correlation matrix Ryy (or Rxx) and the data the credibility of which is low has been deleted, so that the correct azimuths of the arrival waves can be computed, eliminating so-called "pseudo peak" having no relationship with actual wave. But, "the pseudo peak" can not be completely eliminated. Then, it is necessary to utilize a power estimation operation for more correct estimation (related reference patent document [5]).

Document [2]: "Adaptive antenna technique" which has been published by Ohmsha written by Nobuo KIKUMA (ISBN4-274-03611-1)

Document [3]: "MATRIX COMPUTATION" ($3^{rd}$ edition) which has been published by Jhon Hopkins Univ. Press written by Gene H Golub et al. (ISBN0-8018-5414-8)

Patent-related Document [4]: Japanese patent application publication number of which is H10-152629

Patent-related Document [5]: Japanese patent application publication number of which is H10-290766

Concretely speaking, when one or more arrival waves 16 of the same frequency, which are sent from different positions (which are reflected from different positions in case of radar), are respectively radiated on K numbers of antennas 15 with azimuths θ1, θ2, . . . in the apparatus for measuring azimuth of arrival wave 1, the signal receiving portion 5 outputs receiving data x including one or more arrival waves 16 which are received by the respective antennas 15 to the correlation matrix operating portion 6 as receiving data vector X. The receiving data vector X is represented as shown in FIG. 13(a), for instance. In the figure, xi (i is an ordinal number showing the individual antenna. In this case, there are three antennas, and the numbers i=1, 2, 3 are affixed in order. But, the number of the antennas is optional.) is the receiving data of the signal which is received by each antenna 15). The processes on the receiving data are executed on the basis of the MUSIC method, hereinafter.

The receiving data vector X which is comprised of the receiving data xi (i=1, 2, . . . K) which are received by K numbers of the antennas elements is outputted to the correlation matrix operating portion 6. As shown in FIG. 13(b), the correlation matrix operating portion 6 operates and produces the correlation matrix R of the receiving data vector X which is comprised of a K×K square matrix on the basis of the receiving data vector X. The thus obtained correlation matrix R is outputted to the eigenvalue decomposition operating portion 7, and is decomposed into the eigenvector Q and the eigenvalue λ therein.

Figure 3:
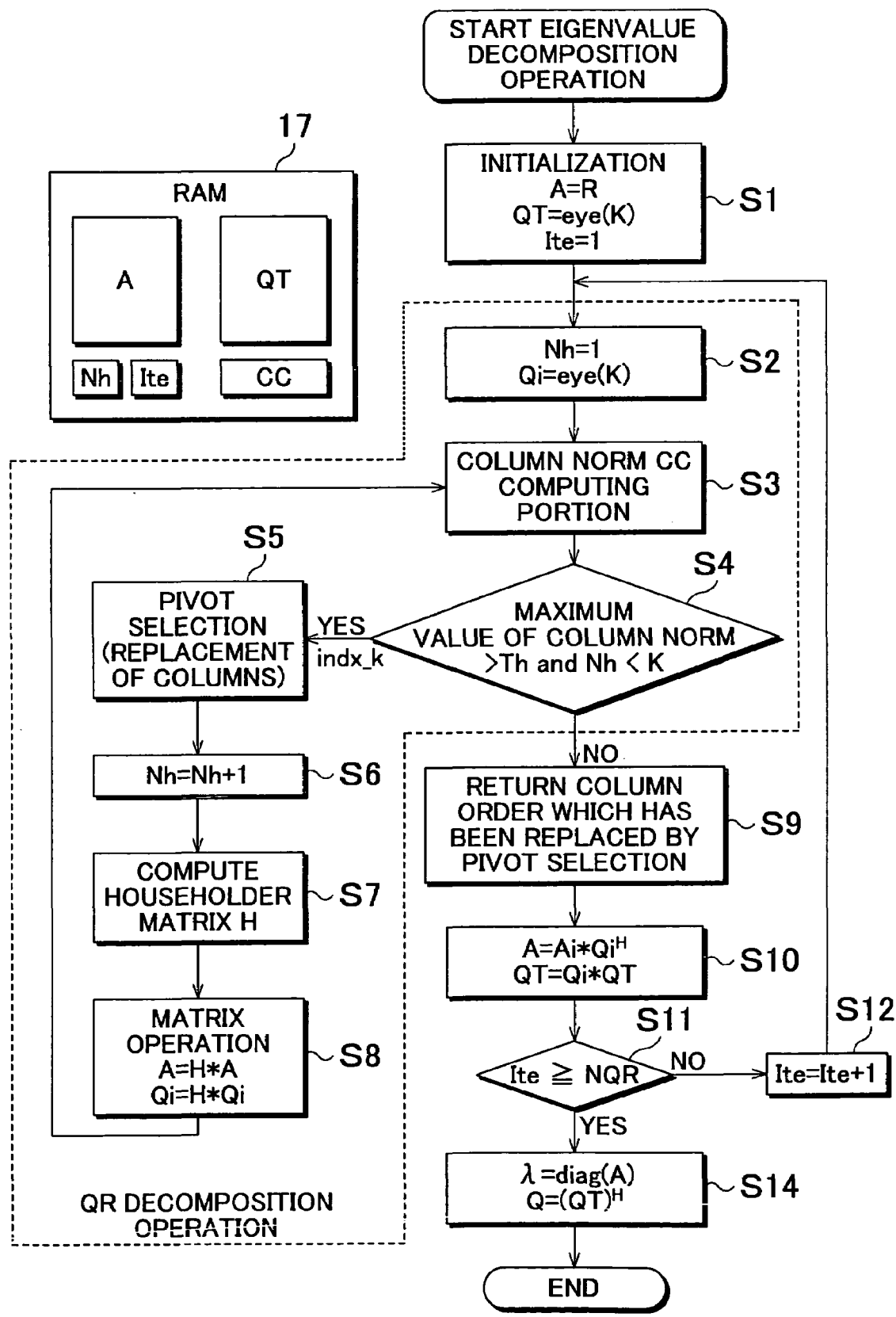
FIG. 3 is a flowchart exemplarily showing processes of eigenvalue decomposition operation.

The eigenvalue decomposition operating portion 7 executes the eigenvalue decomposition operation by the processes as shown in FIG. 3. These processes can be executed by a program of a computer. That is, the eigenvalue decomposition operating portion 7 substitutes the correlation matrix R which is outputted from the correlation matrix operating portion 6 for the matrix A for obtaining the eigenvalue, as shown in Step S1, and executes an initialization process for storing in a RAM (random access memory) 17, which is a memory provided at the apparatus for measuring azimuth of arrival wave 1, as shown in FIG. 3 and FIG. 4(1), (2). As mentioned before, the number of the antennas is optional although the operation as shown in FIG. 4 is explained with the three antennas in order to simplify the explanation.

As shown in FIG. 4(2), at the time of the initialization, the unit matrix having K numbers of elements (the number of elements is three in case of FIG. 4(2)) is substituted for the matrix QT for obtaining the eigenvector, and Ite=1 is substituted for a parameter for representing a cycle operation time of a convergence operation for obtaining the eigenvalue and the substituted is stored in the RAM 17 as shown in FIG. 3(2).

Subsequently, the process enters Step S2 of FIG. 3, the Householder transformation operation time Nh=1 is stored in the RAM 17, as shown in FIG. 4(3), and the unit matrix of order K corresponding to the number of elements K (the unit matrix of order 3 since the number of the elements is 3 in case of FIG. 4(2)) is substituted for the matrix Qi and the substituted is stored in the RAM 17, similarly.

Next, the process enters Step S3 of FIG. 3, and an eigenvalue decomposition operation is implemented. In such an eigenvalue decomposition operation, predetermined cycle times NQR as shown in Step S11 of FIG. 3 of QR decomposition operations including one time or more Householder transformation operations, which are respectively comprised of Steps S3 through S8, are implemented.

Firstly, the column norm cc of the matrix A is computed. The column norm cc of the matrix A as shown in FIG. 4(2) is obtained as shown in FIG. 4(4). In the operation of a column norm cc of the matrix A, on which the Householder transformation operation has not yet been implemented, the operation is implemented on all elements of the matrix A, as shown in FIG. 11(1). The column which has the maximum value of the column norm cc is picked out, and the picked out is substituted for ind_k, and the obtained value is stored in the RAM 17. In case of FIG. 4(4), the second column of the column norm cc has the maximum value 2.9260, so that ind_k=2 is substituted.

Subsequently, the process enters Step S4 of FIG. 3, and whether or not the maximum value of the column norm cc is higher than a preset threshold value Th which is stored in a memory, such as the RAM 17 is judged, and whether or not the implementation time of Householder operations Nh is lower than the number of the elements K of the antenna is judged. Generally, the eigenvalue decomposition operating portion 7 sets the threshold value Th in advance (the threshold value may be set by a program) as the value with which whether or not the maximum value of the column norm cc is negative can be checked, that is, as zero or the value approximating to zero (The threshold value Th is not always zero as long as whether or not the maximum value of the column norm cc is negative can be checked). For this reason, if the column norm becomes a negative value, it is possible to avoid implementation of the Householder operation. Generally, the column norm cc does not generally take a negative value. If the column norm cc becomes a negative value or the value approximating to zero, operation error, such as underflow, is considered to occur. Since the credibility on the obtained eigenvalue is lowered even in the subsequent Householder operations and the load on operation is increased. Then, the process enters Step S9 (will be mentioned later) without the Householder operation Steps S5 through S8.

In general, the analyzable number of the arrival waves which are caught by the signal receiving portion 5 is the number of elements K minus 1, so that the Householder transformation operation implementation time Nh on the correlation matrix R of order K which is necessary for obtaining the eigenvalue is also the number of elements K minus 1 in maximum. Then, the Householder transformation operation implementation time Nh is controlled to be lower than the number of elements K in Step S4 in order to prevent execution of vain transformation operation.

Figure 5:
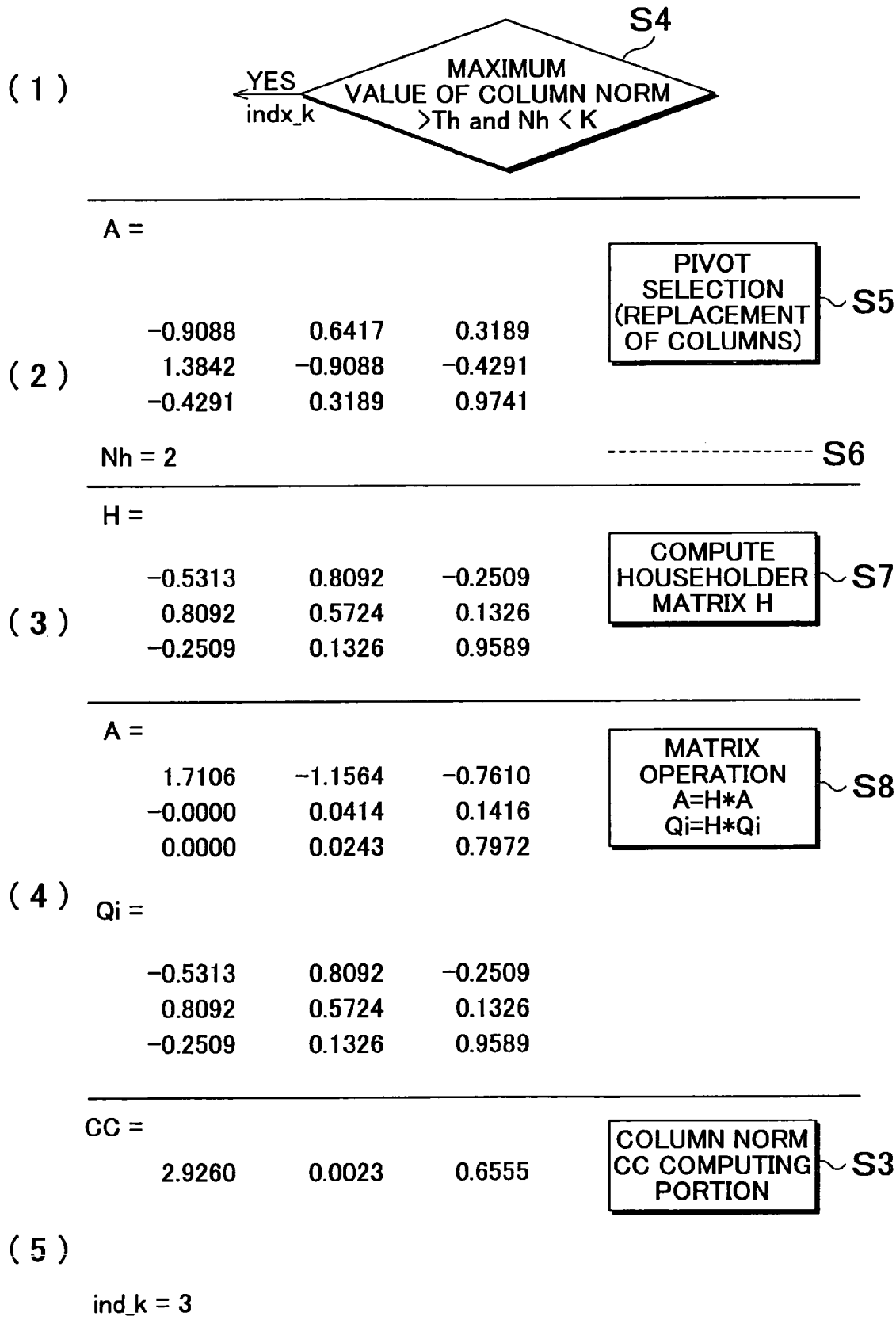
FIG. 5 is a view showing an instance of concrete operation in the flowchart of FIG. 3.

If the maximum value of the column norm cc is judged to be higher than the threshold value Th, and the Householder transformation operation implementation time Nh is judged to be lower than the number of elements K in Step S4, the process enters Step S5 of FIG. 3, and the Householder transformation operation is executed on the matrix A between Step S5 and Step S8 ((1) of FIG. 5).

In Step S5, a pivot selection is firstly executed. The pivot selection is to exchange the column having the maximum value of the column norm cc of Step S3 for the leftest column of the columns wherein the elements excluding the diagonal elements have not yet converted into zero by the Householder transformation operation. In other words, in case of the matrix A of FIG. 4(2), the column where column norm cc is the maximum value is the second column due to ind_k=2 of FIG. 4(4), and the Householder transformation operation has not yet been executed on the matrix A. Therefore, the pivot selection for exchanging the first column which is the leftest in the matrix A for the second column is executed, and the matrix A of FIG. 5(2) is obtained and is stored in the RAM 17 so as to be renewed.

Furthermore, one (1) is added to the Householder operation implementation time Nh in Step S6, and the thus added Nh=2 is stored in the RAM 17 as the new Householder operation implementation time Nh so as to be renewed.

Subsequently, the process enters Step S7, and the Householder matrix H on the matrix A is obtained as shown in FIG. 5(3). And, the matrix operations, A=H*A and Qi=H*Qi are executed in Step S8, and the obtained matrices A and Qi which are shown in FIG. 5(4) are stored in the RAM 17 so as to renew the former matrices A and Qi. In this case, both elements of the first column of the matrix A which are lower than the diagonal elements are converted into zero.

Subsequently, the process returns to Step S3, and the column norm cc is computed again on the matrix A which is a subsequent subject of the Householder transformation operation so as to obtain the value as shown in FIG. 5(5). In the operation of the column norm cc of the matrix A on which the Householder transformation operation has once been implemented, the operation is implemented on the elements lower than the diagonal elements of the matrix which are expected to be converted into zero in the next Householder transformation operation, excluding the elements of the first column which have already been converted into zero, that is, on the square matrix enclosed by a square in the figure, including the diagonal elements $a'_{22}$, $a'_{23}$, $a'_{32}$, $a'_{33}$ of the second and third columns as shown in FIG. 11(2).

There are two methods of operation, (A) and (B). On the basis of the obtained column norms cc, the column norms cc of the second or later columns excluding the first column wherein maximum value of the column norm cc has already been adopted in the first Householder transformation operation are compared with each other in order to obtain the column which shows the maximum value of the column norm cc. In case of FIG. 5(5), the operation ind_k=3 is implemented since the column norm cc in the third column is the maximum value.

Similarly, whether or not the maximum value of the column norm cc is higher than the preset threshold value This judged, and whether or not the Householder transformation operation implementation time Nh is lower than the number of elements of the antenna K is judged in Step S4. In this case, the column norm cc=0.6555 which is higher than zero, and the Householder operation implementation time Nh is two (2) which is lower than the number of elements K=3. Then, the process enters Step S5 again, and the Householder transformation operation is executed again.

In Step S6, the pivot selection is executed. That is, as shown in FIG. 6(2), the column having the maximum column norm cc value is exchanged for the column right adjacent to the column, which has been already converted into zero by the Householder transformation operation. In this case, the second column and the third column are exchanged for each other, so that the matrix A as shown in FIG. 6(2) can be obtained. And, one (1) is added to the Householder transformation operation implementation time Nh so as to be Nh=3 in Step S6.

In the afore-mentioned state, the Householder matrix H on the matrix A of FIG. 6(2) is obtained as shown in FIG. 6(3) in Step S7. And, matrix operations, A=H*A and Qi=H*Qi are executed, and the thus obtained matrices A and Qi as shown in FIG. 6(4) are stored in the RAM 17 so as to renew the former matrices A and Qi in Step S8. With both operations, one element which is lower than the diagonal elements in the second column of the matrix A is converted into zero. Then, in the matrix A, all the elements which are lower than the diagonal elements in the first column and the second column are converted into zero.

Subsequently, the process returns to Step S3 of FIG. 3, and the column norm of the matrix A is obtained again, and the process enters Step A4. At this time, further Householder transformation operation is judged to be unnecessary since the Householder transformation operation implementation time Nh has been three (3) which is equal to the number of elements K, and the process enters Step S9 by skipping the first operation cycle of the convergence operation for obtaining the eigenvalue.

In Step S9, the order of the columns which has been exchanged by the pivot selection in Step S5 is returned to the original. That is, the matrix A of FIG. 6(4) after two times of the Householder transformation operations is one wherein the first, second and third columns of the correlation matrix R are replaced by the second, the third and the first columns in these orders. In order to show such a replacement state, column replacement information piv is set as piv=231 as shown in FIG. 6(5) and is stored in the RAM 17.

Figure 7:
FIG. 7 is a view showing an instance of concrete operation in the flowchart of FIG. 3.

As shown in FIG. 7(1), the respective columns of the matrix A of FIG. 6(4) are replaced, corresponding to the columns of the correlation matrix R on the basis of the column replacement information piv. That is, the first column of the matrix of FIG. 6(4) is replaced by the second column, the second is replaced by the third column, and the third column is replaced by the first column. The result is substituted for the matrix Ai.

Subsequently, the process enters Step S10, and operations, matrix $A=Ai*Qi^H$, QT=Qi*QT are implemented as shown in FIG. 7(2), and the thus obtained matrices A and QT are stored in the RAM 17. Next, the process enters Step S11, whether or not the parameter Ite=1 showing the cycle time of the convergence operations for obtaining the eigenvalue is higher than the predetermined cycle operation time NQR is judged. If the operation time Ite=1 is lower than the predetermined cycle operation time NQR, the process enters Step S12, and one (1) is added to the parameter Ite showing the cycle time, Ite=2 is stored in the RAM 17 so as to renew the former contents. Thereafter, the process enters the second cycle of the convergence operation in the eigenvalue decomposition operation, and the Householder transformation operation is implemented on the matrix A obtained in FIG. 7(2) again so as to converge the diagonal elements of the matrix A on the eigenvalue.

That is, in the eigenvalue decomposition operation in the second cycle of the convergence operation, the Householder transformation operation implementation time Nh is returned to Nh=1 so as to renew the value in the RAM 17 in Step S2 of FIG. 3, and the unit matrix of order K corresponding to the number of elements K is substituted for the matrix Qi again in order to renew the value in the RAM 17.

Thereafter, two times of Householder transformation operations are further implemented on the matrix A of FIG. 7(2) in the second operation cycle of eigenvalue decomposition operation as shown in FIG. 7(5) through FIG. 9(3), so that Nh(=3) is the number of antennas K(=3) in Step S4 of FIG. 3. Then, the process enters Step S9.

As shown in FIG. 8(1) and FIG. 9(1), in Step S9, the order of columns which has been replaced by the pivot selection in Step S5 is returned to the original (In cases of FIG. 8(1) and FIG. 9(1), the pivot selection of the matrix A has not been actually implemented since the maximum values of the column norms cc are respectively the first column (see ind_k=1 of FIG. 8(1), and the second column (ind_k=2 of FIG. 8(4)), and the value is stored in the RAM 17 as the matrix Ai.

The eigenvalue decomposition operating portion 7 controls so as not to implement the Householder transformation operation on the matrix A which has been obtained in the first cycle the times exceeding the times of the Householder transformation operations which have been implemented on the matrix A (the correlation matrix R) in the first cycle in the second or later operation cycle of the eigenvalue decomposition operations. This is because the credibility on the computed result is low even if the Householder transformation operations are implemented, the times exceeding the times of the Householder transformation operations in the first cycle of convergence operation, in the second cycle when the maximum value of the column norm cc is judged to be the same as or lower than the predetermined threshold value Th in Step S4 in the first cycle of the eigenvalue decomposition operation, and even further Householder transformation operation is judged to lead to low credibility on the computed result. For this reason, the implementation time of the Householder transformation operations in the second or later eigenvalue decomposition operations is controlled so as not to exceed the time of the Householder transformation operations which have been implemented in the first cycle on the matrix A (the correlation matrix R) in order to save the burden on the arithmetic processing. In other words, the time of the Householder transformation operations in the first operation cycle is the maximum in the respective operations cycles. And, the Householder transformation operation implementation time Nh is (number of antennas K-1) times in maximum on the basis of the principles of the MUSIC method.

Subsequently, the process enters Step 10, and operations, the matrix $A=Ai*Qi^H$ and $QT=Qi*QT$, are implemented as shown in FIG. 10(1), and the obtained matrices A and QT are stored in the RAM 17. Subsequently, the process enters Step S11, and whether or not the parameter Ite=2 showing the operation time in the RAM 17 is higher than the predetermined operation implementation time NQR is judged. If the operation time Ite=2 is the same as or higher than the predetermined operation time NQR, the diagonal elements of the matrix A are judged to be converged on the eigenvalue, and the process enters Step S14.

In Step S14, the diagonal elements are taken out of the matrix A which has been obtained in FIG. 10(1) (diag (A)), the eigenvalue $\lambda$ is obtained as shown in FIG. 10(3). Furthermore, the eigenvector Q is obtained as a conjugate transpose matrix of the matrix QT of FIG. 10(1), and the obtained is stored in a proper memory, such as the RAM 17.

After thus obtaining the eigenvalue $\lambda$ of the correlation matrix R in the eigenvalue decomposition operating portion 7, the thus obtained eigenvalue $\lambda$ is outputted to the signal rank estimation computing portion 9 of FIG. 1, and by comparing the value comprising the eigenvalues and the predetermined threshold value on the basis of the eigenvalue $\lambda$, the signal rank estimation computing portion 9 judges the value which is higher than the threshold value to be the eigenvalue of the signal of the arrival wave, and the smaller value to be the eigenvalue of the noise so as to estimate and compute the signal rank Lt, that is, the number of arrival waves Lt. If the threshold value is 1.0 in case of the eigenvalue $\lambda$ of FIG. 10(3), for instance, the signal rank Lt is estimated as "1" since the eigenvalue exceeding the threshold value is only 2.2192. Then, the estimated (rank) number of the arrival waves Lt is outputted to the signal rank judging portion 10.

The signal rank judging portion 10 compares the signal rank estimated by the signal rank estimation computing portion 9, that is, the number of arrival waves Lt, and the Householder transformation operation implementation time Nh which has been implemented in the eigenvalue decomposition operating portion 7, and computes the lower value to be the signal rank, that is, the number of arrival waves L, and the obtained number of arrival waves (signals) L is outputted to the spectrum computing portion 11.

As already mentioned, if the maximum value of the column norm cc is the same as or lower than the predetermined threshold value Th, the Householder transformation operation implementation time Nh is controlled so as not to implement further Householder transformation operation due to the increase of load on computation and lowering of the credibility on the computed result. Then, if the implementation time Nh of the Householder transformation operations in each eigenvalue decomposition operation cycle is lower than the number of signals Lt which has been estimated in the signal rank estimation computing portion 9, the estimated number of signals Lt is judged to include the signals the number of which has been judged on the basis of the computed result on the column on which the Householder transformation operation has not been implemented, so that the number equal to the implementation time of the Householder transformation operations is judged to be the signal rank (the number of arrival waves).

If the threshold value Th in the Step S4 of FIG. 3 is zero or the value approximating to zero, especially, the maximum value of the column norm cc is never the value approximating to zero or lower in the normal eigenvalue decomposition operation. Therefore, it is possible to amend the number of arrival waves which has been judged on the basis such data, and to estimate the signal rank with high credibility. Furthermore, if the threshold value Th is zero or the value approximating to zero, it is possible to prevent an excessive judgment on the signal rank from the computed eigenvalue since the Householder transformation operation implementation time Nh is not higher than the number of arrival waves which is estimated from the eigenvalue.

The signal rank judging portion 10 thus judges the signal rank L, taking the Householder transformation operation implementation time Nh into consideration, and the value L is outputted to the spectrum computing portion 11 of FIG. 1. Then, the spectrum operating portion 11 computes the MUSIC spectrum SPE with a known method as shown in FIG. 2, and the thus obtained MUSIC spectrum SPE is outputted to the arrival wave azimuth computing portion 12.

The arrival wave azimuth computing portion 12 can compute the azimuths θ1, θ2 from which the arrival waves arrive on the basis of the MUSIC spectrum SPE with a known method. Then, the correct azimuth of the arrival wave can be computed, eliminating so-called "pseudo radio wave" without reality since the number of signals L has been amended on the basis of the Householder transformation operation implementation time Nh in the eigenvalue decomposition operation on the correlation matrix R, and the data having low credibility has been eliminated from the MUSIC spectrum SPE, as already mentioned.

On this occasion, another value can be used for the threshold value Th in Step S4 of FIG. 3 (or Step S200 of FIG. 14) in the eigenvalue decomposition operation processing. That is, the correlation matrix R at the time when only noise is caught by each antenna 15 in the arrival wave is obtained, a noise column norm of the matrix A for obtaining the eigenvalue is obtained for the correlation matrix R by experiment in advance. By setting a signal threshold value Th' as a value which is higher than the value of the noise column norm (such as an average value and a maximum value) and lower than the value of the signal column norm (such as an average value and a maximum value), the Householder transformation operations can be implemented the time corresponding to the original number of the caught signals. In this case, the Householder transformation operation can be broken in Step S4 when obtaining the maximum value of the column norm cc corresponding to the noise (<Th) in Step S3 of FIG. 3, so that excess Householder transformation operation can be saved and the operation volume can be decreased.

Figure 12:
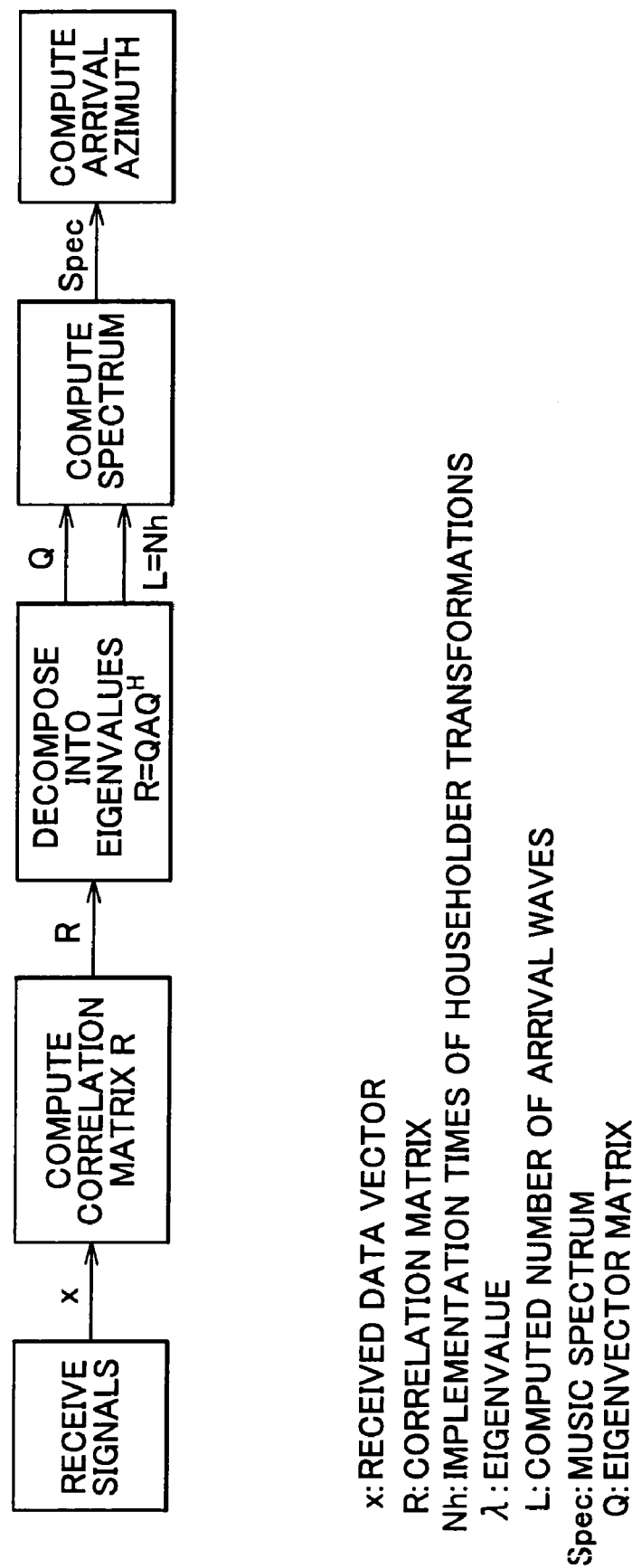
FIG. 12 is a chart showing another instance of processes for judging number of arrival waves.

In this case, the judgment is possible, corresponding to the number of the signals (the number of arrival waves) L and the Householder transformation operation implementation time Nh with each other as shown in FIG. 12, so that the spectrum computing portion 11 can immediately compute the MUSIC spectrum without the estimation of the number of signals and the judgment of the operation with the signal rank estimation computing portion 9 and the signal rank judging portion 10. That is, speedy processing is possible.

Besides, if the threshold value Th is set on the basis of only the value of the noise column norm, irrespective of the value of the signal column norm, setting operation can be simplified. Furthermore, the threshold value Th can be changed according to a situation of receiving arrival waves. For instance, the surroundings is detected with a car navigation system. Then, radio waves radiated from a radar are expected to be reflected by many vehicles and walls and to return in the detected tunnel. An effective operation is possible in such a way that more arrival waves are correctly caught by setting the threshold value Th as a low value when many numbers of arrival waves are expected, and the operation on the signal relating to the vain noise column norm is saved by setting the threshold value Th as a relatively higher value on an open road where small numbers of arrival waves are expected. Besides, even if the observation distance is distant, the low value of the threshold value is effective since the arrival waves are reflected from many places.

If the number of arrival waves or the maximum number thereof is known in advance, vain operation can be saved by setting the implementation time of the Householder transformation operations by means for implementing Householder transformation operation as the number of arrival waves or the maximum number thereof. Furthermore, the implementation time of the Householder transformation operations in each operation cycle (the operation cycle enclosed with a dotted line, referred to as "QR DECOMPOSITION OPERATION" of Steps S2 through S8 of FIG. 3 or Steps 100 through 400 of FIG. 14) can be changed according to the surrounding environment. For instance, the surroundings is detected with a car navigation system. Then, radio waves radiated from a radar are expected to be reflected by many vehicles and walls and to return in the detected tunnel. An effective operation is possible in such a way that the eigenvalues of more arrival waves are correctly computed by setting the implementation time of the Householder transformation operations as a high value when many numbers of arrival waves are expected, and the eigenvalue computing operation on the signal relating to the vain noise column norm is saved by setting the implementation time of the Householder transformation operations as a low value on an open road where small numbers of arrival waves are expected.

In addition, means for implementing convergence operation, such as the eigenvalue decomposition operation portion, implements the QR decomposition operation the predetermined times of the operation cycles (NQR) which is determined in Step S11 of FIG. 3 in such a way that the operation cycle (QR decomposition operation) which is comprised of a predetermined number of times of Householder transformation operations (N−1 times) is implemented, and thereafter the Nth operation cycle (QR decomposition operation) is implemented. In such a case, it is preferable to provide means for controlling the implementation time of the Householder transformation operations in the Nth operation cycle (QR decomposition operation) so as to be the same as or lower than the implementation time of the Householder transformation operations in the last operation cycle or before (QR decomposition operation). This is because the implementation of the Householder transformation operation the time exceeding the implementation time of the Householder transformation operation in the last operation cycle (QR decomposition operation) in the next operation cycle leads to the meaningless implementation of the Householder transformation operation on the matrix which the Householder transformation operation has not been implemented in the last operation.

The present invention can be utilized as an apparatus for estimating direction of arrival wave, for judging a number of arrival waves which arrive at two or more antenna elements, that is, a rank, with a simple constitution, such as a vehicle-mounted radar.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. An apparatus for estimating direction of an arrival wave, for estimating arrival directions of arrival waves from received data of two or more said arrival waves which are received by two or more antennas, comprising:
   means for computing a correlation matrix from said received data of two or more said arrival waves which are received by two or more said antennas;
   eigenvalue decomposition operating means, for implementing Householder transformation operations on said correlation matrix which has been computed by said means for computing a correlation matrix, and for decomposing said correlation matrix into eigenvectors and eigenvalues;

matrix producing means provided at said eigenvalue decomposition operating means, for producing a matrix for obtaining said eigenvalues of said correlation matrix and a matrix for obtaining said eigenvectors therefor;

column norm operating means provided at said eigenvalue decomposition operating means, for respectively computing column norms from elements of respective columns of said matrix for obtaining said eigenvalues, excluding any of said columns having at least one said element which has already become zero by said Householder transformation operation every implementation of said Householder transformation operation in said matrix for obtaining said eigenvalues;

means for judging maximum value of column norm provided at said eigenvalue decomposition operating means, for judging whether or not a maximum value of said column norms, which has been computed by said column norm operating means is the same as or lower than a predetermined threshold value every implementation of said Householder transformation operation;

means for implementing Householder transformation operation provided at said eigenvalue decomposition operating means, for repeating said Householder transformation operation on said matrix for obtaining said eigenvalues only if said means for judging maximum value of column norm judges said maximum value of said column norms not to be the same or not to be lower than said predetermined threshold value;

means for controlling implementation of transformation operation provided at said eigenvalue decomposition operating means, for breaking implementation of said Householder transformation operation by said means for implementing Householder transformation operation, if said means for judging maximum value of column norm judges said maximum value of said column norms to be the same as or lower than said predetermined threshold value;

means for implementing convergence operation provided at said eigenvalue decomposition operating means, for further implementing said Householder transformation operations by said means for implementing Householder transformation operation and said means for controlling implementation of transformation operation on said matrix for obtaining said eigenvalues on which implementation of said Householder transformation operation has been broken by said means for controlling implementation of transformation operation up to a predetermined time, and for obtaining said eigenvectors and said eigenvalues of said correlation matrix on the basis of a result of said Householder transformation operations; and means for judging signal rank, for judging a number of said arrival waves on the basis of said obtained eigenvalues and said implementation time of said Householder transformation operations by said means for implementing Householder transformation operation.

2. The apparatus for estimating direction of arrival wave according to claim 1, wherein memory means for storing zero or a value approximating to zero as said threshold value is provided, and said means for controlling implementation of transformation operation breaks further implementation of said Householder transformation operation if said maximum value of said column norms is negative.

3. An apparatus for estimating direction of an arrival wave, for estimating arrival directions of arrival waves from received data of two or more said arrival waves which are received by two or more antennas, comprising:

means for computing a correlation matrix from said received data of two or more said arrival waves which are received by two or more said antennas;

eigenvalue decomposition operating means, for implementing a Householder transformation operation on said correlation matrix which has been computed by said means for computing a correlation matrix, and for decomposing said correlation matrix into eigenvectors and eigenvalues;

matrix producing means provided at said eigenvalue decomposition operating means, for producing a matrix for obtaining said eigenvalues for said correlation matrix and a matrix for obtaining said eigenvectors therefor;

column norm operating means provided at said eigenvalue decomposition operating means, for respectively computing column norms from elements of respective columns of said matrix for obtaining said eigenvalues, excluding any of said columns having at least one said element which has already become zero by said Householder transformation operation every implementation of said Householder transformation operation in said matrix for obtaining said eigenvalues;

means for judging maximum value of column norm provided at said eigenvalue decomposition operating means, for judging whether or not a maximum value of said column norms, which has been computed by said column norm operating means is the same as or lower than a predetermined threshold value every implementation of said Householder transformation operation;

means for implementing Householder transformation operation provided at said eigenvalue decomposition operating means, for repeating said Householder transformation operation on said matrix for obtaining said eigenvalues only if said means for judging maximum value of column norm judges said maximum value of said column norms not to be the same as or not to be lower than said predetermined threshold value;

means for controlling implementation of transformation operation provided at said eigenvalue decomposition operating means, for breaking implementation of said Householder transformation operation by said means for implementing Householder transformation operation, if said means for judging maximum value of column norm judges said maximum value of said column norms to be the same as or lower than said predetermined threshold value;

means for implementing convergence operation provided at said eigenvalue decomposition operating means, for further implementing said Householder transformation operations by said means for implementing Householder transformation operation and said means for controlling implementation of transformation operation on said matrix for obtaining said eigenvalues on which implementation of said Householder transformation operation has been broken by said means for controlling implementation of transformation operation up to a predetermined time, and for obtaining said eigenvectors and said eigenvalues of said correlation matrix on the basis of a result of said Householder transformation operations;

means for judging signal rank, for judging a number of said arrival waves on the basis of said implementation time of said Householder transformation operations by said means for implementing Householder transformation operation; and means for setting threshold value, for setting said predetermined threshold value so as to be higher than said column norm of said matrix for obtaining said eigenvalue when only noises are caught in said received data.

4. The apparatus for estimating direction of arrival wave according to claim 3, wherein said means for setting threshold value sets said predetermined threshold value so as to be higher than said column norms of said matrix for obtaining said eigenvalues when only noises are caught in said received data and so as to be lower than said column norms of said matrix for obtaining said eigenvalues for said signal of said arrival waves of said received data.

5. The apparatus for estimating direction of arrival wave according to claim 3, wherein said means for setting threshold value changeably sets said predetermined threshold value, corresponding to surroundings or an observation distance.

6. The apparatus for estimating direction of arrival wave according to claim 1 or claim 3, wherein means for setting operation implementation time, for setting a maximum implementation time of said Householder transformation operations by said means for implementing Householder transformation operation is provided, and said means for implementing Householder transformation operation implements said Householder transformation operations within said maximum implementation times of said Householder transformation operations which is set by said means for setting operation implementation time.

7. The apparatus for estimating direction of arrival wave according to claim 6, wherein said means for setting operation implementation time changeably sets said maximum implementation time of said Householder transformation operations, corresponding to surroundings or an observation distance.

8. The apparatus for estimating direction of arrival wave according to claim 1 or claim 3, wherein means for controlling implementation time of transformation operations, for controlling said implementation time of said Householder transformation operations in each implementation time with said means for implementing Householder transformation operation and said means for controlling implementation of transformation operation by said means for implementing convergence operation is provided, and said means for controlling implementation time of transformation operation controls said implementation time of said Householder transformation operations in a Nth time with said mean for implementing Householder transformation operation and said means for controlling implementation of transformation operation so as to be the same as or lower than said implementation time of said Householder transformation operations in the last implementation time or before.

* * * * *